United States Patent [19]

Kruger

[11] Patent Number: 4,778,148

[45] Date of Patent: Oct. 18, 1988

[54] SEALING ARRANGEMENT FOR A ROTARY SLIDE VALVE

[75] Inventor: Hermann Kruger, Wolfsburg, Fed. Rep. of Germany

[73] Assignee: Volkswagen AG, Wolfsburg, Fed. Rep. of Germany

[21] Appl. No.: 64,819

[22] Filed: Jun. 19, 1987

[30] Foreign Application Priority Data

Jun. 25, 1986 [DE] Fed. Rep. of Germany ....... 3621204

[51] Int. Cl.⁴ .......................... F01L 7/16; F16J 15/16; F16K 25/00; F16K 39/04

[52] U.S. Cl. ................................ 251/174; 123/190 E; 251/283; 277/71; 277/99

[58] Field of Search ...................... 277/12, 100, 98, 99, 277/97, 71; 123/190 E; 251/174, 283, 314

[56] References Cited

U.S. PATENT DOCUMENTS

| | | | |
|---|---|---|---|
| 3,109,623 | 11/1963 | Bryant | 251/174 |
| 3,656,498 | 4/1972 | Grove et al. | 251/174 X |
| 4,108,196 | 8/1978 | Calvert et al. | 251/174 X |

FOREIGN PATENT DOCUMENTS

| | | | |
|---|---|---|---|
| 437877 | 5/1912 | France | 123/190 E |
| 518098 | 1/1931 | Fed. Rep. of Germany | . |
| 678953 | 6/1939 | Fed. Rep. of Germany | 123/190 E |

*Primary Examiner*—Allan N. Shoap
*Attorney, Agent, or Firm*—Brumbaugh, Graves, Donohue & Raymond

[57] ABSTRACT

A profiled seal which is subjected to the influence of gas pressure forces in a pressure chamber associated with a rotary slide valve is provided with an enlargement, facing the slide valve, of its inner cross section in order to prevent an inadmissibly large increase of the contact pressure forces between the profiled seal and the slide valve, with an enlargement.

8 Claims, 1 Drawing Sheet

SEALING ARRANGEMENT FOR A ROTARY SLIDE VALVE

BACKGROUND OF THE INVENTION

This invention relates to a sealing arrangement for a rotary slide valve for an internal combustion engine which is subjected to fluctuating pressure in an adjacent pressure chamber, in particular, the combustion chamber of an internal combustion engine. More particularly, the invention is concerned with a profiled seal having a peripheral sliding surface which is applied against a counter surface of the slide valve and an associated sealing gasket for sealing a gap between the outer surface of the profiled seal and a slide valve housing. The profiled seal has at least one surface on which the combustion chamber pressure tends to move the seal in a direction toward the slide valve, and also includes means for making the sealing forces between the sliding surface and the counter surface substantially independent of fluctuations in the chamber pressure.

In a sealing arrangement for a rotary or cylindrical slide valve known from German patent No. 518,098 and having the characteristics indicated, which slide valve, for the purpose of cylinder charge changes, is placed ahead of the cylinder of a piston combustion engine, the profiled seal forms a displaceable cylinder bottom having a cylindrical sliding surface which is applied against the periphery of the rotary slide valve. The cylinder bottom has a large shoulder facing the combustion chamber so that it is pushed against the rotary slide valve by the pressures which fluctuate widely between the intake stroke and the expansion stroke. There results on the collaborating surfaces of the cylinder bottom and the rotary slide valve a large, widely fluctuating load which unfavorably affects the efficiency and useful life of the engine.

This disadvantage is alleviated to some extent in the known construction in that, via diaphragms, swivelling levers acted on by the cylinder pressures in such a manner that when the pressure increases, the levers exert a force on the cylinder bottom in the direction to lift it off the rotary slide valve. It is true that by this measure there is obtained a balancing of the forces of pressure resulting from the cylinder pressure exerted between the cylinder bottom and the rotary slide valve, but only to a limited extent and at a cost of production which is not justifiable. To this must be added an undesirable inertia of the diaphragm-swiveling lever arrangement.

SUMMARY OF THE INVENTION

It is an object of the invention to provide a sealing arrangement of the above-discussed type which is fast-acting and simple to construct and to a large extent prevents undesirable increases of the contact forces between the profiled seal and the slide valve caused by the fluctuating pressures of the medium controlled by the slide valve.

Pursuant to this object, and oters which will become apparent hereafter, one aspect of the present invention resides in a rotary slide valve wherein the profiled seal has at least one additional surface arranged to be directly subjected to the fluctuating combustion chamber pressures in the lifting-off direction of the slide valve, and wherein the previously mentioned first surface and the additional surface are approximately equal in area. Additionally, the sealing arrangement includes at least one spring which acts on the profiled seal for generating the sealing forces.

A great advantage of the invention is that it attains its purpose by the simplest of means, namely, merely by providing a counter pressure surface, for example, in the form of a shoulder, on the inside of the profiled seal. It is also possible to obtain an increase of the inner width of the profiled seal by means of a sloped surface facing the slide.

A rotary slide valve within the meaning of the invention is understood to include a globe valve or a flat slide valve.

An example of the invention will be explained in the following with reference to the drawing.

DETAILED DESCRIPTION OF THE PREFERRED EMBODIMENT

Figure 1:
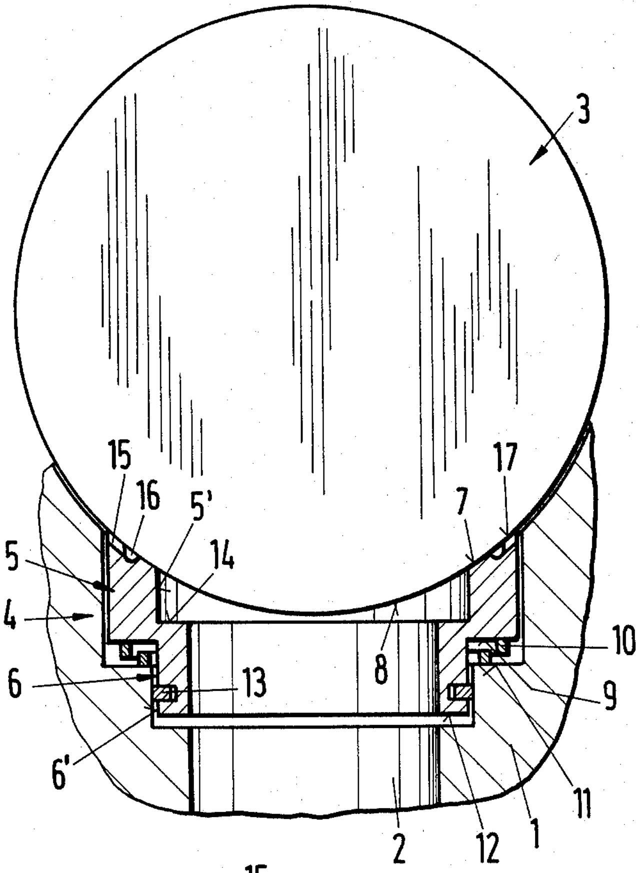
FIG. 1 shows an axial section through a region of a combustion engine of interest here.

Referring to FIG. 1, there is shown a cylinder head 1 having a bore 2 which leads in the downward direction to a combustion chamber of an internal combustion engine, in the case of a piston engine, to a cylinder. In the upward direction, the bore 2 opens into a rotary slide valve 3 shown in contour, which is provided with ducts in a known manner (not illustrated) so that at defined angular positions the valve produces a connection between a carburetor or exhaust system, on the one hand, and the bore 2 on the other hand. The rotary valve 3 is driven by way of the crankshaft of the engine (not shown) in a known manner.

An essential component of the sealing arrangement is a profiled seal 4 of cylindrical shape which is formed in one piece to have cylindrical sections 5 and 6 which in the axial direction are slightly offset relative to each other so as to partially overlap in the axial direction. Considering first the section 5 closest to the rotary slide valve 3, it is seen that it has at its upper end a circularly closed sliding surface 7 which is in tight contact with a counter surface 8 on the periphery of the rotary slide valve 3. The end of cylindrical section 5 facing away from rotary slide valve 3 forms an outer shoulder 9 which serves to support a spring 10 which, in turn, bears on a peripheral shoulder 11 formed in the housing 1 and accordingly biases the profile seal 4 in the direction of the rotary slide valve 3.

Cylindrical section 6 of the profiled seal 4 is further removed from rotary slide valve 3 than section 5, the end face 12 of which faces away from the rotary slide valve 3 and accordingly is subjected to the cylinder pressure. The radial dimension of cylindrical section 6 is sufficiently large to accommodate a gas sealing ring 13 in a peripheral groove formed in the outer surface of section 6, the ring serving to seal the outer gap (which also accommodates the spring 10) between the profiled seal 4, on the one hand, and the housing 1, on the other hand.

In order to balance the forces between the sliding surface 7 and the counter surface 8 of the rotary slide valve 3 due to gas pressure in the cylinder, the inner diameter of cylindrical section 5 of the profiled seal 4 is larger than the inner diameter of section 6 so as to provide an annular shoulder-like enlargement 14. The shoulder 14 faces the rotary slide valve 3 and is thus acted on by the prevailing cylinder pressure, in the downward direction in FIG. 1. Accordingly, the contact force between the profiled seal 4 and the rotary slide valve 3 generated by the prevailing cylinder pressure is proportional to the difference in area between the surfaces 12 and 14. With the accommodation of the sealing ring 13 in the peripheral groove in the outer surface of section 6, the area of the surface of the sealing ring which is subjected to the pressure prevailing in cylinder 2, that is, the area of the gap cross-section, must be added to the area of surface 12. The cylindrical inner surface 5' of cylindrical section 5 has a diameter slightly larger than that of the outer cylindrical surface 6 of section 6 so as to provide a small transverse offset so that the area of the surface of the shoulder 14 equals the sum of the areas of end face 12 and the gap cross-section. Thus, the profiled seal 4 is subjected to a practically constant contact force generated by the spring 10.

Figure 2:
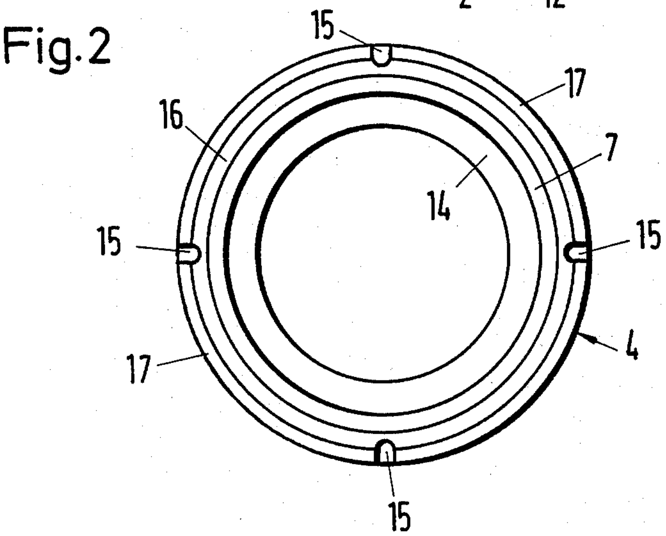
FIG. 2 is a plan view of the sealing arrangement shown in cross-section in FIG. 1.

As best seen in FIG. 2, the sealing surface 7 is surrounded on the outside by an additional sealing slide surface 17 which is interrupted by gas pressure relief grooves 15, and is also relieved of gas pressure by the grooves 15 and an annular groove 16.

Thus, the invention provides a sealing arrangement for a rotary slide valve which in the simplest manner counteracts an inadmissible increase in the contact pressure.

While the invention has been illustrated and described as embodied in a sealing arrangement for a rotary slide valve, it is not intended to be limited to the details shown, since various modifications and structural changes may be made without departing from the spirit of the invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and is desired to be protected by Letters Patent is set forth in the appended claims.

I claim:

1. In an arrangement for providing a seal between a rotary slide valve supported in a slide valve housing and subjected to fluctuating pressures in an adjacent combustion chamber and a cylindrical profiled seal having a peripheral sliding surface at one end thereof which engages a counter surface of the slide valve and a first annular surface at the other end on which said fluctuating pressures act to urge the profiled seal in a direction toward the slide valve and increase the force between said peripheral sliding surface and said counter surface, and a peripheral ring positioned near said other end of said profiled seal for sealing an annular gap between the outer surface of said profiled seal and a mating cavity in said slide valve housing, the improvement comprising:

at least one spring mounted in said slide valve housing and sealed from said combustion chamber arranged to urge said profiled seal towards said slide valve for generating sealing forces between said peripheral sliding surface and the counter surface of said slide valve, said peripheral sliding surface being disposed radially outwardly with respect to said first annular surface, and said profiled seal being shaped to have a second annular surface coaxial and axially aligned with the first annular surface, the second annular surface having an area approximately equal to the area of said first annular surface on which said fluctuating pressures act to urge the profiled seal in a direction away from the slide valve so as to counteract the pressures acting on said first annular surface whereby sealing forces between the sliding surface and the counter surface are provided substantially only by said spring.

2. A sealing arrangement as defined in claim 1, wherein said second surface is an internal shoulder facing the slide valve.

3. A sealing arrangement as defined in claim 2, wherein said profiled seal has a first section and a second section which said second section being located a greater distance from the slide valve than said first section and forming the shoulder, and said first section being located closer to the slide valve and having an end face which forms the peripheral sliding surface.

4. A sealing arrangement as defined in claim 3, wherein said first section has an inner surface and said second section has an outer surface, the diameters of the inner surface and the outer surface being so related as to provide a small relative transverse offset.

5. A sealing arrangement as defined in claim 3, wherein the end of said first section furthest from the slide valve forms an outer shoulder for application of said spring.

6. A sealing arrangement as defined in claim 1, wherein said ring is firmly supported in a groove formed in the outer surface of said second section of the profiled seal, the cross sectional surface of which is considered as a surface acted on by pressure in the direction towards the slide valve.

7. A sealing arrangement as defined in claim 1, wherein said profiled seal has at least one additional sliding surface with grooves for pressure relief, the additional sliding surface being outside said peripheral sliding surface.

8. A sealing arrangement for a rotary slide valve supported in a housing and subjected to fluctuating pressures in an adjacent combustion chamber, the slide valve having a counter surface, the arrangement comprising:

a profiled seal of circular cylindrical shape having a peripheral sliding surface at one end which engages the counter surface of the slide valve, an outer surface defining one surface of a gap between said outer surface and the slide valve housing, at least a first surface on which the fluctuating pressures act to urge said profiled seal in a direction toward the slide valve and, at least one additional surface on which said pressures act to urge said profiled seal in a lifting-off direction away from the slide valve, said at least first surface and said at least one additional surface being coaxial and axially aligned and having approximately equal areas;

the preipheral sliding surface being disposed radially outwardly with respect to the first surface;

a sealing ring for sealing the gap between said outer surface and the slide valve housing; and spring means supported in said housing and sealed from said chamber arranged to urge said profiled seal toward said slide valve so as to generate sealing forces between said peripheral sliding surface and said counter surface.

* * * * *